2 Sheets. Sheet. 1.

Swartz. v. Kreamer.
Harvester Rake.

No. 2,996. Reissued. June. 23. 1868.

2 Sheets. Sheet 2.

Swartz v. Kreamer.
Harvester Rake.

No. 2996.

Reissued June 23. 1868

Witnesses:
Alex Mahon

C Authman by his atty
George Harding atty

UNITED STATES PATENT OFFICE.

C. AULTMAN, OF CANTON, OHIO, ASSIGNEE OF DANIEL M. SWARTZ AND JONATHAN KREAMER, OF MILLHEIM, PENNSYLVANIA.

IMPROVEMENT IN HARVESTER-RAKES.

Specification forming part of Letters Patent No. 38,514, dated May 12, 1863; Reissue No. 2,996, dated June 23, 1868.

*To all whom it may concern:*

Be it known that DANIEL M. SWARTZ and JONATHAN KREAMER, of Millheim, in the county of Centre and State of Pennsylvania, did invent certain new and useful Improvements in Rakes and Reels for Harvesting-Machines; and we do hereby declare the following to be a full, clear, and exact description of the same, reference being had to the accompanying drawings, making a part of this specification, in which—

Figure 1:
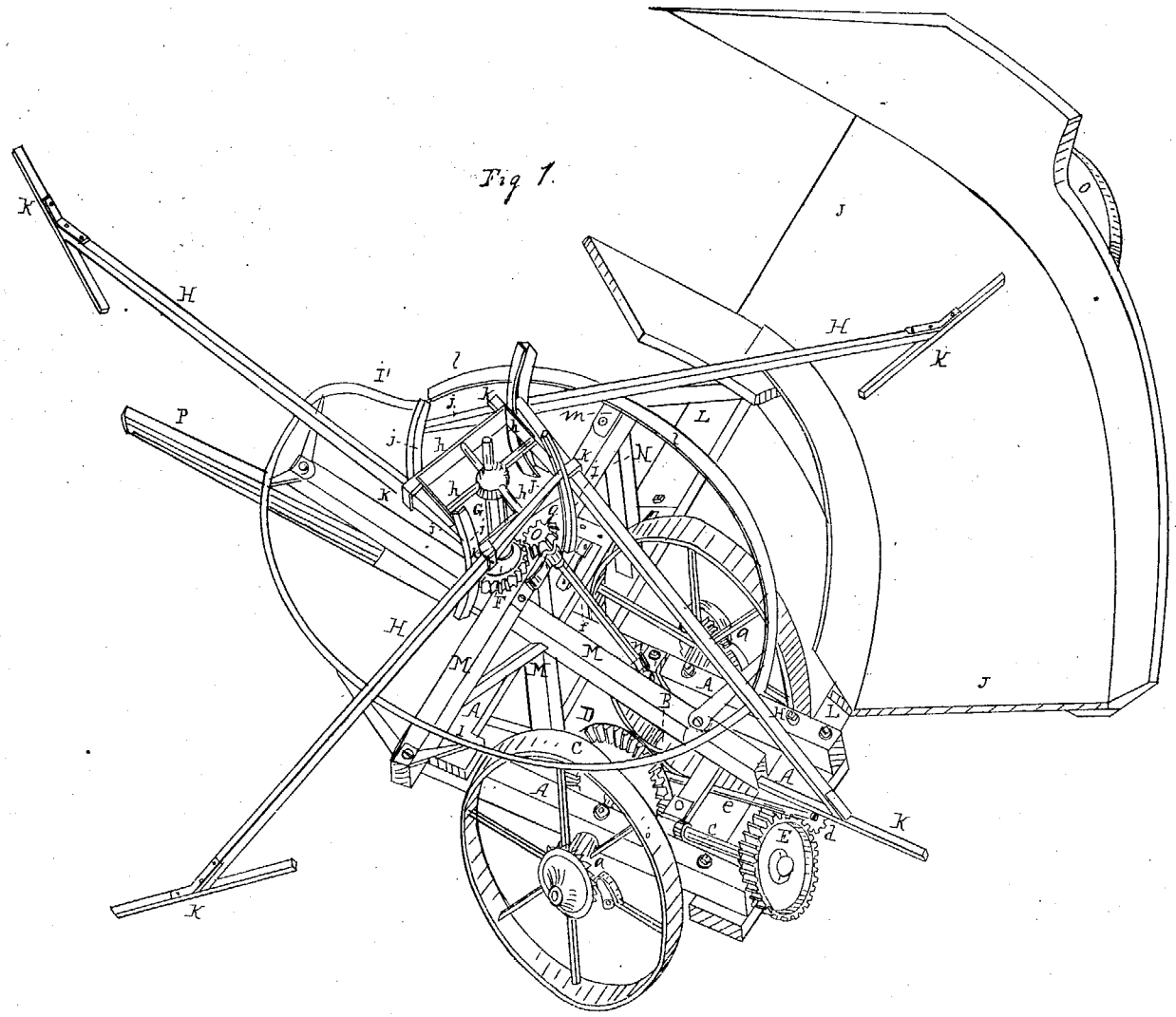
Figure 2:
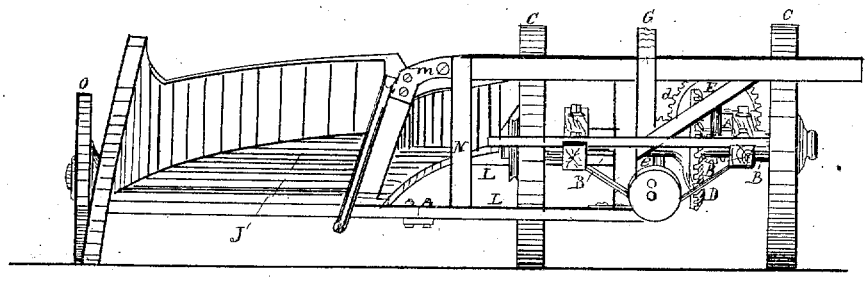

Figure 1 represents so much of a harvesting-machine with the rake and reel upon it as will illustrate the invention. Fig. 2 represents a front elevation of the machine with the rake and reel omitted, but showing how the latter is attached and driven.

The nature of this invention consists in adapting a combined rake and reel to a front-cut hinged-bar harvester, so that the combined rake and reel shall conform to the undulations of the platform as it moves over the ground, and in driving said revolving rake and reel, so located, from the main shaft; and, further, in attaching the arms to the revolving head, so as to approach the front of the cutter in a line nearly parallel thereto.

To enable others skilled in the art to make and use the invention, we will proceed to describe the same with reference to the drawings.

A represents the main frame of the harvesting-machine, supported on the axle B, upon which are placed the two driving and supporting wheels C C, said wheels being furnished with ratchet and pawl *a*, in the usual well-known manner, and for the usual purpose. The axle B has upon it a beveled gear, D, which, through a beveled pinion, *b*, shaft *c*, gear E, pinion *d*, and shaft *e*, gives motion to the cutters. It also has a small bevel-pinion that gears with a similar pinion on the lower end of the shaft *f*, by which motion is communicated to said shaft *f*. On the upper end of the shaft *f* there is a bevel-pinion, *g*, that works in and turns a gear, F, on the vertical shaft G, as also the shaft itself. On top of the shaft G is placed a peculiarly-constructed head or frame. This head is enlarged, and the arms of the combined reel and rake are independent of each other, and are pivoted to said head, not in lines radial to the shaft about which they rotate, as in Dorsey's machine, but in lines tangential to a circle of which the shaft is the center, for the purpose of bringing the gathering-heads up to the cutter in lines parallel to it, or nearly so, which would not be the case if the arms were radial. This head *h* has at its four corners grooved arcs *i i i i*, for guiding and steadying the rear ends *j j j j* of the four rake and reel stales H, said stales being pivoted at points forward of their rear ends at *k*, and though we have shown four rakes and guides, yet we can use more or less than that number, if we so prefer to do.

At about the center, in length, of the rake-stales H there are small hooks, that take under the cam-ledge *l* on the cam-guide I, which surrounds the rake and reel gear, to hold the rake and reel to its work when passing over the platform J, and the ends of the rake and reel stales or handles have arms K upon them, which serve as reel-arms to draw in the grain to the cutters, and some of these arms may have projecting from their lower sides teeth to act as rakes in sweeping the cut grain from the platform and delivering it in a gavel upon the ground.

The cam-guide I, as shown by the drawing, holds up the rake or reel levers H sufficiently high to allow them to pass over the machine until they come to the point I′, where they suddenly drop, and their hooks taking under the cam-ledge *l*, they cannot rise until they have passed to the end of said ledge. By this arrangement, together with the arc-guides *i*, the rakes are rigidly held to their work when acting as rakes, as well as when acting as reels to draw in the grain to the cutters.

The platform J is hinged, by the coupling-bars L, to the main frame, at or near the line of the crank-shaft *e*, that drives the cutters, so that the platform may rise and fall, in conforming to the irregularities of the ground, without cramping the pitman that vibrates the cutters.

The front coupling-bar L is attached to the main frame by a hinge, and to the cutter-bar by a stiffening or brace plate, by which the rake and platform are supported. The frame M, that carries the reel and rake, the cam-guide I, and some of the reel and rake driving-gear are also pivoted to the main frame at or by the same pivots that connect the platform to the main frame. Indeed, the reel and rake frame may be termed part and parcel of the platform-frame, as they are or may be rigidly united to each other, at *m*, by an iron plate, and, further, by a brace or standard, N, so that the rake and reel and the platform will always move together.

That the rake and reel, which are driven from the main axle B on the main frame, may have the rising-and-falling motion that the platform has, without cramping the gear, which is partly on each of the two frames, we arrange a toggle-joint at *n*, in which a long square shank on the shaft *f* may freely play in and out, and still work the gear without cramping or binding.

O is the outside supporting-wheel for the platform, and P the tongue by which the machine is guided by the team.

Having thus described the invention, what is claimed is—

1. The combination of a main frame supported upon two wheels, a laterally-projecting platform, and cutting apparatus, which shall be in advance of the main axle, with the support of a series of combined rake and reel arms rigidly connected with the finger-bar.

2. The combination, with a two-wheel front-cut harvester, of a main frame between the wheels, the hinged supporting-bars L L, the cutting apparatus and platform, and a series of revolving rake and reel arms pivoted to a central hub, and driven by an extensible shaft from the main axle.

3. Mounting a combined rake and reel on a front-cut harvester in advance of the main axle.

4. The combination of a combined rake and reel having independent hinged arms, a platform hinged to the main frame, and the support of the reel and rake rigidly connected with the platform and finger-beam, so as to conform thereto.

5. A series of pivoted arms of a revolving rake and reel attached, near the periphery of an enlarged head or hub, in lines tangential to a circle the center of which is in the shaft around which said arms rotate, so as to cause the revolving heads or rakes to approach the cutter in lines parallel, or nearly parallel, thereto.

6. A combined revolving rake and reel, in combination with a hinged-bar harvester, a coupling-arm, and a movable brace or plate to support the finger-bar platform and rake and reel.

DANIEL M. SWARTZ.
JONATHAN KREAMER.
C. AULTMAN.

Witnesses to signatures of Swartz and Kreamer:
J. H. MYERS,
R. W. LAIRD,
D. C. WILT.

Witnesses to signature of Aultman:
JOHN TONNER,
JAS. S. TONNER.